(12) United States Patent
Burton et al.

(10) Patent No.: US 12,269,750 B2
(45) Date of Patent: Apr. 8, 2025

(54) EMM-58 ZEOLITE COMPOSITIONS, SYNTHESES, AND USES

(71) Applicant: ExxonMobil Technology and Engineering Company, Annandale, NJ (US)

(72) Inventors: Allen W. Burton, Stewartsville, NJ (US); Hilda B. Vroman, Piscataway, NJ (US); Joseph M. Falkowski, Hampton, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 169 days.

(21) Appl. No.: 18/040,403

(22) PCT Filed: Aug. 7, 2020

(86) PCT No.: PCT/US2020/045379
§ 371 (c)(1),
(2) Date: Feb. 2, 2023

(87) PCT Pub. No.: WO2022/031294
PCT Pub. Date: Feb. 10, 2022

(65) Prior Publication Data
US 2024/0010506 A1    Jan. 11, 2024

(51) Int. Cl.
*C01B 39/48* (2006.01)
*B01J 29/70* (2006.01)
*C01B 39/02* (2006.01)

(52) U.S. Cl.
CPC .............. *C01B 39/48* (2013.01); *B01J 29/70* (2013.01); *C01B 39/026* (2013.01);
(Continued)

(58) Field of Classification Search
None
See application file for complete search history.

(56) References Cited

U.S. PATENT DOCUMENTS 5,015,797 A * 5/1991 Lee .................... C07C 41/30
585/467
5,173,282 A * 12/1992 Hellring ................ C01B 39/265
423/713

(Continued)

FOREIGN PATENT DOCUMENTS

CN           107892309           10/2019

OTHER PUBLICATIONS

Database of Zeolite Structures (2022) 1 page http://www.iza-structure.org/databases.
(Continued)

*Primary Examiner* — Tam M Nguyen
(74) *Attorney, Agent, or Firm* — Shook, Hardy & Bacon L.L.P.

(57) ABSTRACT

An aluminosilicate zeolite may have a molar ratio of Si to Al of about 3 to about 10, a monoclinic space group C2/m with unit cell dimensions of a of 13.6 Å+/−5%, b of 21.7 Å+/−5%, c of 6.7 Å+/−5%, and β of 93°+/−3°, 12-ring pores along a c-axis having dimensions of 7 Å+/−5% by 6 Å+/−5%, and 8-ring pores along an a-axis having dimensions of 3 Å+/−5% by 3 Å+/−5%. Said aluminosilicate zeolites may be useful in hydrocarbon conversion processes, selective catalytic reduction of NOx, $CO_2$ and/or $N_2$ adsorption, carbonylation reactions, and the monoalkylamine and dialkylamine syntheses.

7 Claims, 3 Drawing Sheets

(52) U.S. Cl.
CPC ........ *B01J 2229/16* (2013.01); *B01J 2229/37* (2013.01); *C01P 2002/72* (2013.01); *C01P 2002/76* (2013.01); *C01P 2004/03* (2013.01)

(56) References Cited

U.S. PATENT DOCUMENTS

| | | | | |
|---|---|---|---|---|
| 5,175,135 | A * | 12/1992 | Lee | C07C 2/864 |
| | | | | 502/64 |
| 5,177,281 | A * | 1/1993 | Haag | C07C 5/2518 |
| | | | | 585/324 |
| 5,382,420 | A * | 1/1995 | Vaughan | B01J 29/70 |
| | | | | 423/700 |
| 2008/0085968 | A1 * | 4/2008 | Urtel | C08L 59/00 |
| | | | | 524/450 |
| 2011/0132804 | A1 * | 6/2011 | Stevenson | B01J 29/047 |
| | | | | 208/65 |
| 2019/0284057 | A1 * | 9/2019 | Abudawoud | B01J 29/46 |
| 2020/0109058 | A1 | 4/2020 | Burton et al. | C01B 39/48 |
| 2022/0331787 | A1 * | 10/2022 | Kunkes | B01D 53/9477 |
| 2024/0300820 | A1 * | 9/2024 | Pham | C01B 39/026 |

OTHER PUBLICATIONS

Chemical and Engineering News, 63(5), 27 (1985).

Zi, W. W. et al. (2019) "Designed Synthesis of an Extra-Large Pore Zeolite with a 14-Membered Ring Channel via Supramolecular Assembly Templating Approach," *Microporous and Mesoporous Materials*, v.290(14), 6 pages.

Zi, W. W. et al. (2020) "An Extra-Large-Pore Pure Silica Zeolite with 16x8x8-Membered Ring Pore Channels Synthesized Using an Aromatic Organic Directing Agent," *Angewandte Chemie International Ed.*, v.59(10), pp. 3948-3951.

* cited by examiner

EMM-58 ZEOLITE COMPOSITIONS, SYNTHESES, AND USES

FIELD OF INVENTION

The present disclosure related to aluminosilicate zeolite compositions, syntheses, and uses.

BACKGROUND OF THE INVENTION

Zeolites are a family of porous materials having a regular inorganic framework structure with a plurality of pores or channels of set size that are defined therein. The pore or channel size varies for different zeolites and determines the breadth of molecules that may enter the interior of a particular zeolite. Because of their microporosity of defined size and the molecular specificity gained therefrom, zeolites often find particular utility in adsorption, ion-exchange, gas separation, and catalyst applications. Various zeolite framework structures recognized by the Structure Commission of the International Zeolite Association are maintained in a structural database accessible at http://www.iza-structure.org/databases.

The idealized inorganic framework structure of zeolites is a framework silicate in which all tetrahedral atoms are connected by oxygen atoms with the four next-nearest tetrahedral atoms. The term "silicate," as used herein, refers to a substance containing at least silicon and oxygen atoms that are alternately bonded to each other (i.e., —O—Si—O—Si—), and optionally including other atoms within the inorganic framework structure, including atoms such as boron, aluminum, or other metals (e.g., transition metals, such as titanium, vanadium, or zinc). Atoms other than silicon and oxygen in the framework silicate occupy a portion of the lattice sites otherwise occupied by silicon atoms in an 'all-silica' framework silicate. Thus, the term "framework silicate," as used herein, refers to an atomic lattice comprising any of a silicate, borosilicate, gallosilicate, ferrisilicate, aluminosilicate, titanosilicate, zincosilicate, vanadosilicate, or the like.

The structure of the framework silicate within a given zeolite determines the size of the pores or channels that are present therein. The pore or channel size may determine the types of processes for which a given zeolite is applicable. Currently, greater than 200 unique zeolite framework silicate structures are known and recognized by the Structure Commission of the International Zeolite Association, thereby defining a range of pore geometries and orientations.

The framework silicates of zeolites are commonly characterized in terms of their ring size, wherein the ring size refers to the number of silicon atoms (or alternative atoms, such as those listed above) that are tetrahedrally coordinated with oxygen atoms in a loop to define a pore or channel within the interior of the zeolite. For example, an "8-ring" zeolite refers to a zeolite having pores or channels defined by 8 alternating tetrahedral atoms and 8 oxygen atoms in a loop. The pores or channels defined within a given zeolite may be symmetrical or asymmetrical depending upon various structural constraints that are present in the particular framework silicate.

SUMMARY OF THE INVENTION

The present disclosure related to aluminosilicate zeolite compositions, syntheses, and uses.

The present disclosure includes a composition comprising: an aluminosilicate zeolite having a molar ratio of Si to Al of about 3 to about 10, wherein the aluminosilicate zeolite has (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%.

The present disclosure includes an aluminosilicate zeolite having coordination sequences of T-atoms of: T1 4 10 19 32 48 69 98 126 154 192; T2 4 11 17 30 48 72 100 125 150 186; T3 4 10 20 32 47 69 96 126 159 191; and T4 4 10 19 31 48 71 97 125 156 189.

The present disclosure includes a method comprising: maintaining an aqueous reaction mixture comprising a silicon atom source, an aluminum atom source, and a structure directing agent selected from the group consisting of N,N', 2-trimethylbenzimidazolium, N,N',2-dimethylbenzimidazolium, and a combination thereof to a temperature of about 135° C. to about 180° C. to yield an aluminosilicate zeolite having (i) a molar ratio of Si to Al of about 3 to about 10 and (ii) a structure having (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%.

The present disclosure includes a method comprising: maintaining an aqueous reaction mixture comprising a silicon atom source, an aluminum atom source, and a structure directing agent selected from the group consisting of N,N', 2-trimethylbenzimidazolium, N,N',2-dimethylbenzimidazolium, and a combination thereof to a temperature of about 135° C. to about 180° C. to yield an aluminosilicate zeolite having coordination sequences of T-atoms of: T1 4 10 19 32 48 69 98 126 154 192; T2 4 11 17 30 48 72 100 125 150 186; T3 4 20 32 47 69 96 126 159 191; and T4 4 10 19 31 48 71 97 125 156 189.

The foregoing aluminosilicate zeolites and aluminosilicate zeolites produced by the foregoing methods may be applied in one or more of the following: organic compound conversion processes (e.g., hydrocarbon conversion processes), selective catalytic reduction of NOx, $CO_2$ and/or $N_2$ adsorption, carbonylation reactions, and the production of monoalkylamines and dialkylamines. For example, a method may comprise: performing a hydrocarbon conversion process in the presence of said aluminosilicate zeolites, wherein the hydrocarbon conversion process is selected from the group consisting of cracking, hydrocracking, disproportionation, alkylation, and isomerization.

BRIEF DESCRIPTION OF FIGURES

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
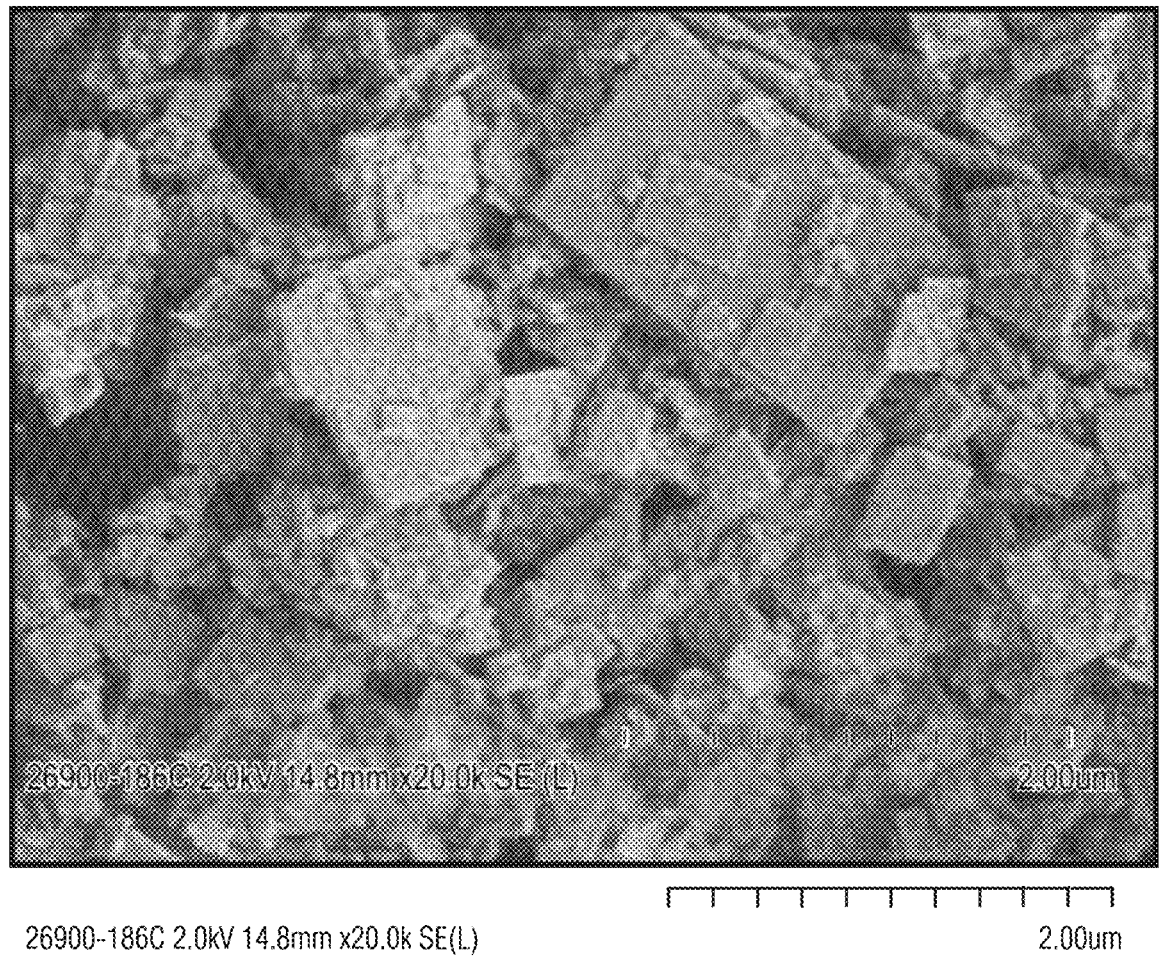
FIG. 1 is a (scanning electron microscope) SEM image of Sample 5.

The present disclosure related to aluminosilicate zeolites compositions, syntheses, and uses. Said aluminosilicate zeolites (referred to herein as EMM-58 zeolites) have a unique structure that is similar to mordenite but with smaller 8-ring pores. Advantageously, the smaller 8-ring pores of the EMM-58 zeolite may provide sites that are advantageous for the adsorption and/or conversion of small molecules.

The EMM-58 zeolites described herein have coordination sequences of the T-atoms of: T1 4 10 19 32 48 69 98 126 154 192; T2 4 11 17 30 48 72 100 125 150 186; T3 4 20 32 47 69 96 126 159 191; and T4 4 10 19 31 48 71 97 125 156 189.

The EMM-58 zeolites of the present disclosure (as-produced, treated (e.g., with acid or acid and steam), and/or calcined) have a structure that has (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%.

The EMM-58 zeolites described herein are prepared using N,N',2-trimethylbenzimidazolium (Compound 1, where the X$^-$ counter ion may be OH$^-$, F$^-$, Cl$^-$, Br$^-$, I$^-$), N,N',2-dimethylbenzimidazolium (Compound 2, where the X$^-$ counter ion may be OH$^-$, F$^-$, Cl$^-$, Br$^-$, I$^-$), or a mixture of Compounds 1 and 2 as a structure directing agent (SDA).

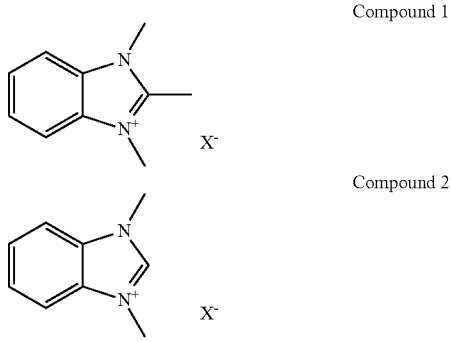

Compound 1

Compound 2

The EMM-58 zeolites described herein are an aluminosilicate zeolite synthesized by heating an aqueous reaction mixture comprising a silicon atom source, an aluminum atom source, and an SDA (e.g., N,N',2-trimethylbenzimidazolium, N,N',2-dimethylbenzimidazolium, or a combination thereof) to a temperature of about 135° C. to about 180° C. (or 145° C. to about 175° C., or about 150° C. to about 170° C., or about 155° C. to about 165° C.) to yield a EMM-58 zeolite described herein having a molar ratio of Si to Al of about 3 to about 10 (or about 3 to about 7, or about 5 to about 10). The aqueous reaction mixture can be maintained at about 135° C. to about 180° C. (or 145° C. to about 175° C., or about 150° C. to about 170° C., or about 155° C. to about 165° C.) for about 20 days to about 36 days (or about 25 days to about 30 days).

Examples of silicon atom sources include, but are not limited to, a colloidal suspensions of silica, a precipitated silica alkali metal silicate, tetraalkyl orthosilicate, a different Si-containing zeolite, and the like, and any combination thereof.

Examples of aluminum atom sources include, but are not limited to, aluminum nitrate, aluminum sulfate, sodium aluminate, aluminum oxide, alumina sol, alumina trihydrate, clays (e.g., kaolin and metakaolin), other Al-containing zeolites (e.g., FAU-type zeolites like zeolite Y), and the like, and any combination thereof.

A molar ratio of Si to Al in the aqueous reaction mixture may be about 2 to about (or about 2 to about 25, or about 15 to about 40, or about 25 to about 50).

A molar ratio of Si to the SDA (e.g., N,N',2-trimethylbenzimidazolium, N,N',2-dimethylbenzimidazolium, or a combination thereof) in the aqueous reaction mixture may be about 0.1 to about 1 (or about 0.1 to about 0.5, or about 0.2 to about 0.7, or about 0.5 to about 1).

A molar ratio of water to Si in the aqueous reaction mixture may be about 20 to about 100 (or about 20 to about 50, or about 40 to about 70, or about 50 to about 75, or about 70 to about 90, or about 80 to about 100).

Acids and bases may be added to the aqueous reaction mixture to achieve a desired concentration of OH$^-$. Without being limited by theory, it is believed that a higher molar ratio of OH$^-$ to Si decreases the molar ratio of Si to Al in the EMM-58 zeolite because the silica is more soluble at higher OH$^-$ concentration relative to alumina. A molar ratio of OH$^-$ to Si in the aqueous reaction mixture may be about 0.3 to about 1 (or about 0.3 to about 0.6, or about 0.5 to about 1).

Optionally, seeds can be included in the aqueous reaction mixture. The amount of seeds in the reaction mixture can be about 0.1 wt % to about 10 wt % (or about 0.5 wt % to about 7 wt %, or about 1 wt % to about 5 wt %) based on the weight of the silicon atom source in the reaction mixture.

In some instances, at least a portion of the aluminum in the EMM-58 zeolite can be released or removed from the structure to further increase the Si to Al ratio in the EMM-58 zeolite. This can be achieved by treating the EMM-58 zeolite with an acid or steam followed by acid. For example, the EMM-58 zeolite may be exposed to an acid at about 25° C. to about 80° C. (or 25° C. to about 50° C., or about 45° C. to about 80° C.) for about 2 hours to about 36 hours (or about 2 hours to about 12 hours, or about 8 hours to about 24 hours, or about 12 hours to about 36 hours). In another example, the EMM-58 zeolite may be exposed to steam and then to an acid at about 25° C. to about 80° C. (or 25° C. to about 50° C., or about 45° C. to about 80° C.) for about 2 hours to about 36 hours (or about 2 hours to about 12 hours, or about 8 hours to about 24 hours, or about 12 hours to about 36 hours) and the exposed to acid for about 2 hours to about 36 hours (or about 2 hours to about 12 hours, or about 8 hours to about 24 hours, or about 12 hours to about 36 hours). In these two examples, the resultant EMM-58 zeolite may have a molar ratio of Si to Al of about 3 to about 10 (or about 3 to about 8, or about 4 to about 6).

Examples of acids suitable for treating the EMM-58 zeolite include, but are not limited to, sulfuric acid, hydrochloric acid, acetic acid, nitric acid, and any combination thereof.

The EMM-58 zeolites of the present disclosure (as produced or after treatment with acid or steam/acid) can be calcined (e.g., in air or another oxygen-containing gas) at a temperature of about 500° C. to about 900° C. (or 550° C. to about 850° C., or about 600° C. to about 800° C.). Calcining can be for about 10 minutes to about 8 hours (or about 30 minutes to about 5 hours, or about 1 hour to about 3 hours).

The EMM-58 zeolites of the present disclosure can have an average diameter of about 0.1 microns to about 25 microns (or about 1 micron to about 15 microns, or about 3 microns to about 10 microns). Particle size can be determined by imaging the crystals with scanning electron microscopy and averaging the diameter of at least 100 crystals. The crystals have a facetted shape. Therefore, the diameter is defined as the largest distance passing from one side to the other through the center of the crystal.

The EMM-58 zeolites of the present disclosure can have surface area of about 350 m²/g to about 700 m²/g (or about 350 m²/g to about 550 m²/g, or about 500 m²/g to about 700 m²/g). Surface area is determined using Brunauer, Emmett and Teller (BET) analysis with nitrogen adsorption (ASTM D4365-13).

The EMM-58 zeolites of the present disclosure can have micropore volume of about 0.15 cm³/g to about 0.30 cm³/g (about 0.15 cm³/g to about 0.25 cm³/g, or about 0.20 cm³/g to about 0.30 cm³/g). Micropore volume is determined via nitrogen adsorption by ASTM D4365-13.

The EMM-58 zeolites of the present disclosure can have characteristic X-ray diffraction (XRD) patterns, the essential (most intense) reflection lines of which may be represented in Table 1 (as synthesized form) and Table 2 (calcined form). In said tables, the d is a range in which the peak intensity is identified. Once identified, the relative peak area is measured and normalized where the largest peak area is 100. That is, the range provided is not necessarily the range used to measure the relative percent area.

TABLE 1

| d(Å) | Peak Relative % Area |
|---|---|
| 11.7-11.9 | 20-40 |
| 10.8-11.1 | 35-55 |
| 6.8-7.0 | 20-40 |
| 6.4-6.6 | 35-55 |
| 5.7-5.9 | 10-30 |
| 4.7-4.9 | 80-100 |
| 4.4-4.6 | 30-50 |
| 3.69-3.75 | 10-30 |
| 3.65-3.68 | 20-40 |
| 3.56-3.62 | 50-70 |
| 3.44-3.49 | 50-70 |
| 3.19-3.24 | 40-60 |
| 3.04-3.09 | 20-40 |

TABLE 2

| d(Å) | Peak Relative % Area |
|---|---|
| 11.5-11.7 | 80-100 |
| 10.8-11.1 | 60-80 |
| 6.7-6.9 | 40-60 |
| 6.3-6.5 | 20-40 |
| 4.71-4.75 | 60-80 |
| 4.42-4.50 | 15-35 |
| 4.20-4.28 | 15-35 |
| 3.65-3.70 | 10-25 |
| 3.60-3.64 | 10-25 |
| 3.54-3.59 | 25-45 |
| 3.40-3.44 | 35-55 |
| 3.17-3.23 | 45-65 |
| 3.02-3.05 | 15-30 |

Applications

EMM-58 zeolites of the present disclosure can be used as a catalyst to facilitate one or more organic compound conversion processes including many of present commercial/industrial importance. Examples of organic compound conversion processes (e.g., hydrocarbon conversion processes) include, but are not limited to, cracking, hydrocracking, disproportionation, transalkylation, alkylation, and isomerization. Such catalysts may include (a) EMM-58 zeolites and (b) rare earth metals and/or metals of Groups 2 to 15 of the Periodic Table of the Elements. As used herein, the numbering scheme for the Periodic Table Groups is as disclosed in Chemical and Engineering News, 63(5), 27 (1985).

The EMM-58 zeolites and metals may be formed into the catalyst by known methods including, but not limited to, cocrystallization, exchanged into the EMM-58 zeolite structure, impregnated in the EMM-58 zeolite structure, intimately physically admixed together, and the like, and any combination thereof.

As in the case of many catalysts used in organic compound (hydrocarbon) conversion processes, it may be desirable to incorporate the EMM-58 zeolites with another material resistant to the temperatures and other conditions employed in organic conversion processes. Such materials can include active and inactive materials and synthetic or naturally occurring zeolites, as well as inorganic materials such as clays, silica, and/or metal oxides such as alumina. The latter may be either naturally occurring or in the form of gelatinous precipitates or gels, including mixtures of silica and metal oxides. Use of a material in conjunction with the EMM-58 zeolites can tend to change the conversion and/or selectivity of the catalyst in certain organic conversion processes. Inactive materials can suitably serve as diluents to control the amount of conversion in a given process so that products can be obtained in an economic and orderly manner without employing other (more costly) means for controlling the rate of reaction. These materials may be incorporated into naturally occurring clays (e.g., bentonite and kaolin) to improve the crush strength of the catalyst under commercial operating conditions. Said materials (i.e., clays, oxides, etc.) can function as binders for the catalyst. It can be desirable to provide a catalyst having good crush strength, because in commercial use it can be desirable to prevent the catalyst from breaking down into powder-like materials (attrition). These clay and/or oxide binders have been employed normally only for the purpose of improving the crush strength of the catalyst.

Naturally occurring clays which can be composited with the EMM-58 zeolites can include, without limitation, the montmorillonite and kaolin family, which families include the subbentonites, and the kaolins commonly known as Dixie, McNamee, Georgia, and Florida clays, or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with the EMM-58 zeolites can additionally or alternatively include inorganic oxides, such as silica, zirconia, titania, magnesia, beryllia, alumina, and mixtures thereof.

Alternatively or in addition to the foregoing materials, the EMM-58 zeolites can be composited with a porous matrix material such as silica-alumina, silica-magnesia, silica-zirconia, silica-thoria, silica-beryllia, silica-titania, and/or one or more ternary compositions such as silica-alumina-thoria, silica-alumina-zirconia silica-alumina-magnesia, and silica-magnesia-zirconia.

The relative proportions of EMM-58 zeolites and inorganic oxide matrix may vary widely, with the EMM-58 zeolite content ranging from about 1 wt % to about 90 wt %, and, more usually, particularly when the composite is prepared in the form of beads, in the range of about 2 wt % to about 80 wt % of the composite. An exemplary matrix content range can include from about 10 wt % to about 50 wt %.

In another example, catalysts that include (a) EMM-58 zeolites and (b) rare earth metals and/or metals of Groups 2 to 15 of the Periodic Table of the Elements (preferably cobalt, tungsten, vanadium, or a combination thereof) may be useful in selective catalytic reduction. Nitrogen oxides (NOx) are produced, for example, when nitrogen reacts with oxygen within a combustion chamber under high temperature and pressure conditions. NOx can also be produced, for example, in fluid catalytic converters (FCCs) and furnaces due to combustion of nitrogen from FCC feeds, heating oil, and/or fuel oil. Such nitrogen oxides can include either one or a combination of nitrogen monoxide and nitrogen dioxide. Various selective catalytic reduction methods have been developed in an effort to reduce NOx emissions. Generally, selective catalytic reduction is a process by which NOx can be reduced into diatomic nitrogen and water. By way of nonlimiting example, ammonia (NH 3) can be mixed into the exhaust stream in the catalytic reactor and act as a reducing agent (also known generally as a "reductant"). The NOx can react with ammonia in the presence of the catalyst to produce diatomic nitrogen and water. The NOx reduction efficiency can vary with a variety of parameters, including temperature, flow velocity of the exhaust stream, ratio of reductant to NOx, presence of other chemicals in the exhaust stream, and the like. One factor that impacts the reduction efficiency is the catalyst selected.

Accordingly, a method of the present disclosure for selective catalytic reduction of NOx includes providing an exhaust stream containing an amount of NOx from a combustion operation. At least a portion of the exhaust stream and a reductant stream including ammonia are introduced to a catalytic reactor that includes at least one zeolite catalyst (comprising (a) EMM-58 zeolites and (b) rare earth metals and/or metals of Groups 2 to 15 of the Periodic Table of the Elements (preferably cobalt, tungsten, vanadium, or a combination thereof)) to reduce the amount of NOx in the exhaust stream. The NOx-reduced exhaust stream is then directed from the catalytic reactor. Further, a system for selective catalytic reduction of NOx includes a conduit in fluid communication with a source of an exhaust stream containing NOx from a combustion operation and a source of a reductant stream including ammonia. The system includes a catalytic reactor in fluid communication with the conduit and the source of the reductant stream. The catalytic reactor includes at least one zeolite catalyst (comprising (a) EMM-58 zeolites and (b) rare earth metals and/or metals of Groups 2 to 15 of the Periodic Table of the Elements (preferably cobalt, tungsten, vanadium, or a combination thereof)). The catalytic reactor is configured to receive at least a portion of the exhaust stream and the reductant stream at suitable operating conditions to reduce the amount of NOx in the stream. The system also includes an outlet in fluid communication with the catalytic reactor to direct the NOx reduced exhaust stream from the catalytic reactor.

$CO_2$ and/or $N_2$ adsorption is another example application of the EMM-58 zeolites described herein. The pores of the EMM-58 zeolites may be suitably sized for adsorption of $CO_2$ and/or $N_2$.

The EMM-58 zeolites described herein may also be useful in carbonylation reactions. Carbonylation reaction generally refers to a reaction where CO is incorporated into a substrate. Here, the EMM-58 zeolite may be used in the acid form, ion-exchanged form, or in combination with a transition metal (e.g., copper, silver, gold, nickel iridium, rhodium, platinum, palladium, cobalt, or a combination thereof). For example, dimethyl ether, dimethyl carbonate or methanol reacted with carbon monoxide in the presence of the EMM-58 zeolite may be useful in producing at least one of ethanol, acetic acid, and methyl acetate.

The EMM-58 zeolites described herein may also be useful in the reaction of organic oxygenates with ammonia to produce monoalkylamines and dialkylamines, particularly methylamine and dimethylamine. Examples of suitable organic oxygenate compounds for use in this reaction include alcohols having 1 to 3 carbon atoms, specifically, methanol, ethanol, n-propanol and isopropanol, and their ether counterparts, including methyl ethyl ether, dimethyl ether, diethyl ether and di-isopropyl ether. The reaction is conducted, preferably, but not exclusively, in a flowing system in a gaseous fixed bed or fluidized bed, with the molar ratio of ammonia to oxygenate being generally from about 0.5 to about 20, such as about 1 to about 5. The reaction conditions typically include a temperature of about 200° C. to 400° C. (or about 250° C. to about 360° C.), a pressure of about 0.1 MPa to about 10 MPa (or about 0.5 MPa to about 2 MPa) and gas hourly space velocity (GHSV) of about 100 $hr^{-1}$ to about 10,000 $hr^{-1}$.

EXAMPLE EMBODIMENTS

A first nonlimiting example embodiment of the present disclosure is a composition comprising: an aluminosilicate zeolite having a molar ratio of Si to Al of about 3 to about 10, wherein the aluminosilicate zeolite has (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%. The first nonlimiting example embodiment may include one or more of: Element 1: the composition having, in an as-synthesized form, an X-ray diffraction pattern including d-spacings (d(Å)) and peak relative percent areas according to Table 1; Element 2: the composition having, in a calcined form, an X-ray diffraction pattern including d-spacings and peak relative percent areas according to Table 2; Element 3: the composition further comprising one or more selected from the group consisting of: mordenite, a DON-type zeolite, analcime, quartz, and cristobalite; Element 4: wherein the aluminosilicate zeolite further comprises a hydrogenating metal. Examples of combinations include, but are not limited to, Element 1 in combination with Element 3, Element 4, or Elements 3 and 4; Element 2 in combination with Element 3, Element 4, or Elements 3 and 4; and Elements 3 and 4 in combination.

The composition of the first nonlimiting example embodiment in combination with Element 4 (and optionally one or more of Elements 1-3) may be useful in a method comprising: performing a hydrocarbon conversion process in the presence of said composition, wherein the hydrocarbon conversion process is selected from the group consisting of cracking, hydrocracking, disproportionation, alkylation, and isomerization.

A second nonlimiting example embodiment of the present disclosure is an aluminosilicate zeolite having coordination sequences of T-atoms of: T1 4 10 19 32 48 69 98 126 154 192; T2 4 11 17 30 48 72 100 125 150 186; T3 4 10 20 32 47 69 96 126 159 191; and T4 4 10 19 31 48 71 97 125 156 189. The second nonlimiting example embodiment may include one or more of: Element 1; Element 2; Element 3; Element 4; Element 5: the aluminosilicate zeolite having a molar ratio of Si to Al of about 3 to about 10; and Element 6: wherein the aluminosilicate zeolite has (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%. Examples of combinations include, but are not limited to, Element 1 in combination with one or more of Elements 3-6; Element 2 in combination with one or more of Elements 3-6; and two or more of Elements 3-6 in combination.

The composition of the second nonlimiting example embodiment in combination with Element 4 (and optionally one or more of Elements 1-3 and 5-6) may be useful in a method comprising: performing a hydrocarbon conversion process in the presence of said composition, wherein the hydrocarbon conversion process is selected from the group consisting of cracking, hydrocracking, disproportionation, alkylation, and isomerization.

A third nonlimiting example embodiment of the present disclosure is a method comprising: maintaining an aqueous reaction mixture comprising a silicon atom source, an aluminum atom source, and a structure directing agent selected from the group consisting of N,N',2-trimethylbenzimidazolium, N,N',2-dimethylbenzimidazolium, and a combination thereof to a temperature of about 135° C. to about 180° C. to yield an aluminosilicate zeolite having (i) a molar ratio of Si to Al of about 3 to about 10 and (ii) a structure having (a) a monoclinic space group C2/m with unit cell dimensions of a of 13.6 Å+/−5%, b of 21.7 Å+/−5%, c of 6.7 Å+/−5%, and $\beta$ of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%.

A fourth nonlimiting example embodiment of the present disclosure is a method comprising: maintaining an aqueous reaction mixture comprising a silicon atom source, an aluminum atom source, and a structure directing agent selected from the group consisting of N,N',2-trimethylbenzimidazolium, N,N',2-dimethylbenzimidazolium, and a combination thereof to a temperature of about 135° C. to about 180° C. to yield an aluminosilicate zeolite having coordination sequences of T-atoms of: T1 4 10 19 32 48 69 98 126 154 192; T2 4 11 17 30 48 72 100 125 150 186; T3 4 10 20 32 47 69 96 126 159 191; and T4 4 10 19 31 48 71 97 125 156 189.

The third or fourth nonlimiting example embodiments may further include one or more of: Element 7: wherein the aqueous reaction mixture has a molar ratio of Si to Al of about 2 to about 50; Element 8: wherein the aqueous reaction mixture has a molar ratio of Si to the structure directing agent of about 0.1 to about 1; Element 9: wherein the aqueous reaction mixture has a molar ratio of water to Si of about 20 to about 100; Element 10: wherein the silicon atom source is selected from the group consisting of: a colloidal suspensions of silica, a precipitated silica alkali metal silicate, tetraalkyl orthosilicate, a different Si-containing zeolite, and any combination thereof; Element 11: wherein the aluminum atom source is selected from the group consisting of: aluminum nitrate, aluminum sulfate, sodium aluminate, aluminum oxide, alumina sol, alumina trihydrate, a clay, another Al-containing zeolite, and any combination thereof; Element 12: wherein the temperature is about 150° C. to about 170° C.; Element 13: the method further comprising: maintaining the aqueous reaction mixture about 135° C. to about 180° C. for about 20 days to about 36 days; Element 14: wherein the aqueous reaction mixture further comprises seeds having a structure of the aluminosilicate zeolite; Element 15: wherein maintaining the aqueous mixture further yields one or more selected from the group consisting of: mordenite, a DON-type zeolite, analcime, quartz, and cristobalite; Element 16: wherein, in an as-synthesized form, an X-ray diffraction pattern of the aluminosilicate zeolite has d-spacings and peak relative percent areas according to Table 1; Element 17: the method further comprising: treating the aluminosilicate zeolite with acid or steam then acid; Element 18: the method further comprising: calcining the aluminosilicate zeolite at 500° C. to 900° C. to produce a calcined aluminosilicate zeolite; Element 19: Element 18 and wherein an X-ray diffraction pattern of the calcined aluminosilicate zeolite has d-spacings and peak relative percent areas according to Table 2. Examples of combinations include, but are not limited to, two or more of Elements 7-9 in combination; one or more of Elements 7-9 in combination with one or more of Elements 10-13; Element 14 in combination with one or more of Elements 7-13; Element 15 in combination with one or more of Elements 7-14; Element 16 in combination with one or more of Elements 7-15; Element 17 in combination with one or more of Elements 7-16; and Element 18 (and optionally Element 19) in combination with one or more of Elements 7-17.

Numerical ranges used herein include the numbers recited in the range. For example, the numerical range "from 1 wt % to 10 wt %" includes 1 wt % and 10 wt % within the recited range.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. A silica atom source, aluminum atom source, sodium hydroxide, N,N',2-trimethylbenzimidazolium (SDA), and optionally EMM-58 zeolite seeds were combined according to Table 3. For Samples 2 and 5, HCl was added at a molar ratio of HCl:Si of 0.25 to reduce the net OH⁻:Si molar ratio. For Sample 3, the net OH⁻:Si molar ratio was 0.31.

TABLE 3

| React. Cond. | Sample 1 | Sample 2 | Sample 3 | Sample 4 | Sample 5 | Sample 6 | Sample 7 |
|---|---|---|---|---|---|---|---|
| Temp. (° C.) | 160 | 160 | 160 | 160 | 160 | 160 | 160 |
| Time | 28 days | 28 days | 7 days | 7 days | 7 days | 7 days | 7 days |
| Si Source | 7330N* | 7330N* | 7330N* | 7330N* | 7330N* | 7330N* | 7330N* |
| Al Source | $Na_2Al_2O_4$ | $Na_2Al_2O_4$ | aluminum nitrate | $Na_2Al_2O_4$ | $Na_2Al_2O_4$ | $Na_2Al_2O_4$ | $Na_2Al_2O_4$ |
| OH Source | NaOH | NaOH | NaOH | NaOH | NaOH | NaOH | NaOH |
| Mole Ratio Si:Al | 40 | 40 | 40 | 40 | 40 | 40 | 40 |
| Mole Ratio $H_2O$:Si | 83 | 85 | 30 | 90 | 90 | 90 | 90 |
| Mole Ratio SDAOH:Si | 0.3 | 0.3 | 0.3 | 0.3 | 0.3 | 0.3 | 0.3 |
| Mole Ratio NaOH:Si | 0.70 | 0.70 | 0.3 | 0.3 | 0.7 | 0.7 | 0.7 |
| Mole Ratio HCl:Si | 0 | 0.25 | 0 | 0 | 0.25 | 0.25 | 0.25 |
| Seeds | none | none | Sample 1 | Sample 1 | Sample 1 | Sample 5 | Sample 5 |

*AERODISP ™ 7330N is fumed silica with about 30% silica content and an alkaline pH available from Evonik.

Sample 1 produced primarily EMM-58 zeolite of the present disclosure with a minor mordenite contamination. Sample 2 produced primarily EMM-58 zeolite of the present disclosure with a minor quartz contamination. Sample 3 produced a mixture of mordenite and quartz. Sample 4 produced anacime zeolite. Sample 5 produced nearly pure EMM-58 zeolite of the present disclosure. Sample 6 produced nearly pure EMM-58 zeolite of the present disclosure. Sample 7 produced EMM-58 zeolite having a molar ratio of Si to Al of 4.

Figure 2A:
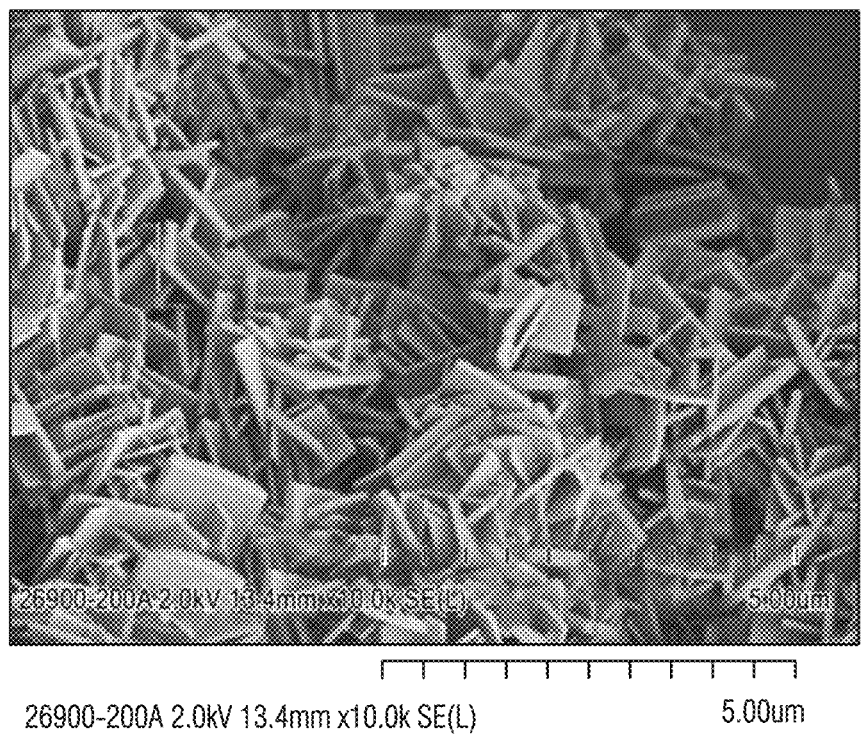
FIGS. 2A and 2B are the SEM images of Sample 6.
Figure 2B:
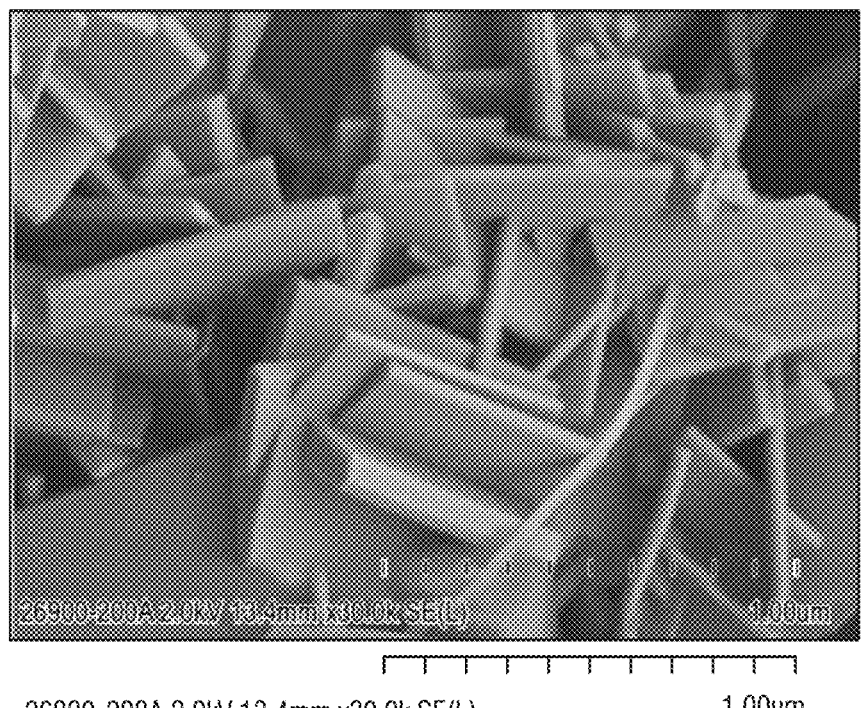
Figure 3:
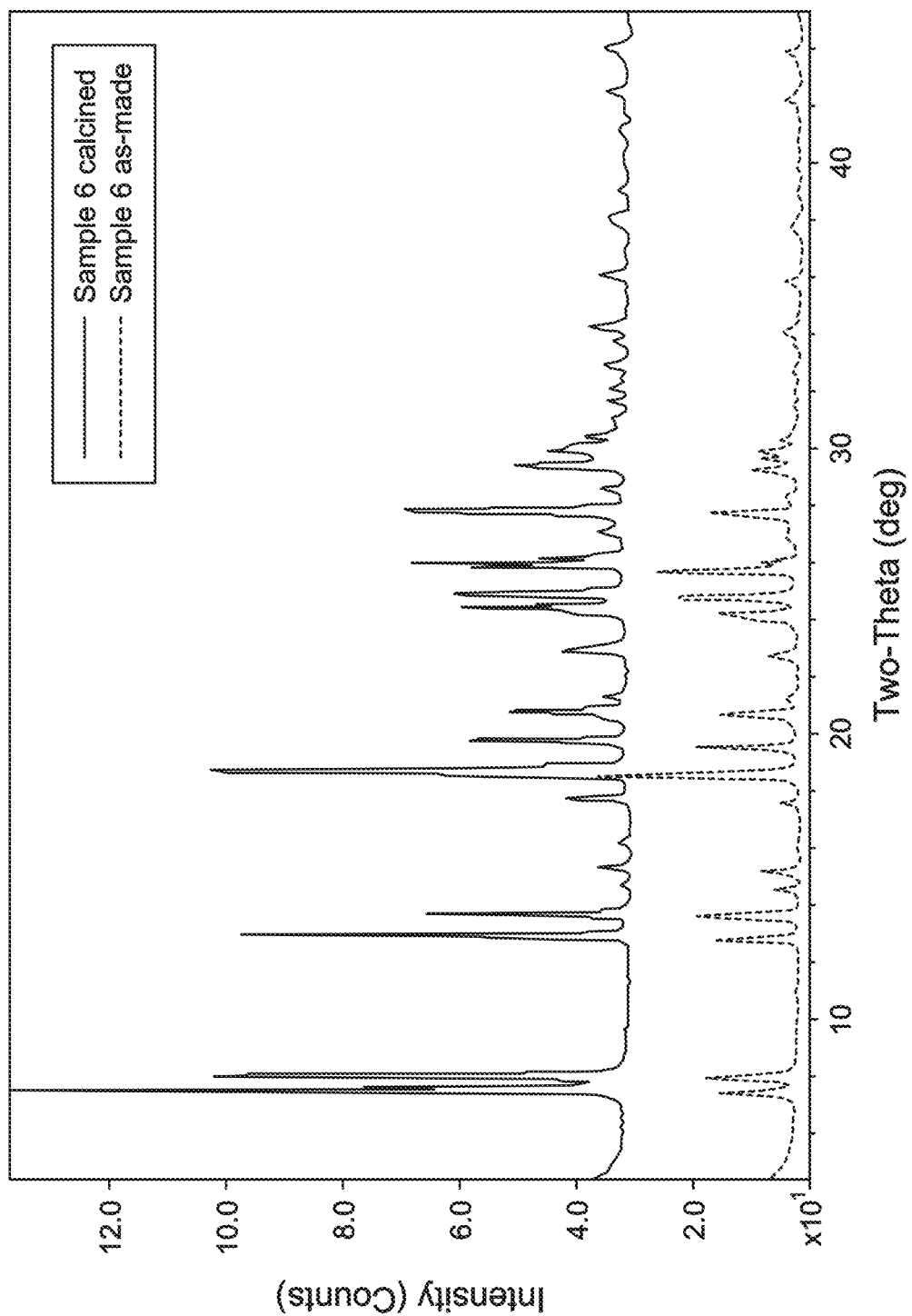
FIG. 3 is a plot that includes the XRD patterns for Sample 6 as-made (bottom) and after calcining (top).

FIG. 1 is an SEM image of Sample 5 showing the EMM-58 zeolite and minor layered phase impurities. FIGS. 2A and 2B are the SEM images of Sample 6 illustrating the essentially pure EMM-58 zeolite. FIG. 3 is a plot that includes the XRD patterns for Sample 6 as-made (bottom) and after calcining at 540° C. in air for 1 hour (top).

Three additional samples were prepared according to Table 4.

TABLE 4

| Reaction Conditions | Sample 8 | Sample 9 |
|---|---|---|
| Temp. (° C.) | 160 | 160 |
| Time | 7 days | 7 days |
| Si Source | 7330N* | 7330N* |
| Al Source | $Na_2Al_2O_4$ | $Na_2Al_2O_4$ |
| OH Source | NaOH | NaOH |
| Mole Ratio Si:Al | 40 | 40 |
| Mole Ratio $H_2O$:Si | 90 | 90 |
| Mole Ratio SDAOH:Si | 0.3 | 0.3 |
| Mole Ratio NaOH:Si | 0.3 | 0.7 |
| Mole Ratio HCl:Si | 0 | 0.25 |
| Seeds | Sample 1 | Sample 1 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed:

1. A composition comprising:
an aluminosilicate zeolite having a molar ratio of Si to Al of about 3 to about 10, wherein the aluminosilicate zeolite has (a) a monoclinic space group C2/m with unit cell dimensions of a of 13.6 Å+/−5%, b of 21.7 Å+/−5%, c of 6.7 Å+/−5%, and β of 93°+/−3°, (b) 12-ring pores along a c-axis having dimensions of 7 Å+/−5% by 6 Å+/−5%, and (c) 8-ring pores along an a-axis having dimensions of 3 Å+/−5% by 3 Å+/−5%.

2. The composition of claim 1 having, in an as-synthesized form, an X-ray diffraction pattern including d-spacings (d(Å)) and peak relative percent areas of:

| d(Å) | Peak Relative % Area |
|---|---|
| 11.7-11.9 | 20-40 |
| 10.8-11.1 | 35-55 |
| 6.8-7.0 | 20-40 |
| 6.4-6.6 | 35-55 |
| 5.7-5.9 | 10-30 |
| 4.7-4.9 | 80-100 |
| 4.4-4.6 | 30-50 |
| 3.69-3.75 | 10-30 |
| 3.65-3.68 | 20-40 |
| 3.56-3.62 | 50-70 |
| 3.44-3.49 | 50-70 |
| 3.19-3.24 | 40-60 |
| 3.04-3.09 | 20-40. |

3. The composition of claim 1 having, in a calcined form, an X-ray diffraction pattern including d-spacings (d(Å)) and peak relative percent areas of:

| d(Å) | Peak Relative % Area |
|---|---|
| 11.5-11.7 | 80-100 |
| 10.8-11.1 | 60-80 |
| 6.7-6.9 | 40-60 |
| 6.3-6.5 | 20-40 |
| 4.71-4.75 | 60-80 |
| 4.42-4.50 | 15-35 |
| 4.20-4.28 | 15-35 |
| 3.65-3.70 | 10-25 |
| 3.60-3.64 | 10-25 |
| 3.54-3.59 | 25-45 |
| 3.40-3.44 | 35-55 |
| 3.17-3.23 | 45-65 |
| 3.02-3.05 | 15-30. |

4. The composition of claim 1, further comprising one or more selected from the group consisting of: mordenite, a DON-type zeolite, analcime, quartz, and cristobalite.

5. The composition of claim 1, wherein the aluminosilicate zeolite further comprises a hydrogenating metal.

6. A method comprising: performing a hydrocarbon conversion process in the presence of the composition of claim 1, wherein the hydrocarbon conversion process is selected from the group consisting of cracking, hydrocracking, disproportionation, alkylation, and isomerization.

7. The composition of claim 1 wherein the aluminosilicate zeolite has coordination sequences of T-atoms of: T1 4 10 19 32 48 69 98 126 154 192; T2 4 11 17 30 48 72 100 125 150 186; T3 4 10 20 32 47 69 96 126 159 191; and T4 4 10 19 31 48 71 97 125 156 189.

* * * * *